US 12,226,898 B2

(12) United States Patent
Hama et al.

(10) Patent No.: US 12,226,898 B2
(45) Date of Patent: Feb. 18, 2025

(54) DRIVING MECHANISM AND ROBOT

(71) Applicant: Seiko Epson Corporation, Tokyo (JP)

(72) Inventors: Hidenori Hama, Shiojiri (JP); Yuta Ichimiya, Matsumoto (JP); Shingo Hoshino, Hokuto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/587,059

(22) Filed: Jan. 28, 2022

(65) Prior Publication Data
US 2022/0241960 A1    Aug. 4, 2022

(30) Foreign Application Priority Data

Jan. 29, 2021   (JP) ................................. 2021-013794

(51) Int. Cl.
*B25J 9/10*  (2006.01)
*B25J 9/12*  (2006.01)
*B25J 9/04*  (2006.01)

(52) U.S. Cl.
CPC ............... *B25J 9/104* (2013.01); *B25J 9/126* (2013.01); *B25J 9/042* (2013.01); *B25J 9/108* (2013.01)

(58) Field of Classification Search
CPC ................................. B25J 9/042; B25J 9/104
See application file for complete search history.

(56) References Cited

U.S. PATENT DOCUMENTS

| 5,007,784 A | * | 4/1991 | Genov | ..................... | B25J 9/042 |
| | | | | | 414/416.03 |
| 5,064,340 A | * | 11/1991 | Genov | ................. | B25J 19/0029 |
| | | | | | 414/935 |
| 5,271,292 A | * | 12/1993 | Sawada | .................... | B25J 9/044 |
| | | | | | 474/69 |
| 5,741,113 A | * | 4/1998 | Bacchi | .................... | B25J 9/104 |
| | | | | | 901/17 |

(Continued)

FOREIGN PATENT DOCUMENTS

| CN | 107457777 A | * | 12/2017 | |
| CN | 109227597 A | * | 1/2019 | ............... B25J 17/00 |

(Continued)

*Primary Examiner* — Bobby Rushing, Jr.
(74) *Attorney, Agent, or Firm* — Harness, Dickey & Pierce, P.L.C.

(57) ABSTRACT

A driving mechanism according to an aspect includes a first pulley configured to rotate around a first axis, a motor configured to rotate the first pulley around the first axis, a second pulley disposed to be separated from the first pulley and configured to rotate around a second axis parallel to the first axis, a first belt laid around the first and second pulleys and configured to transmit power of the motor from the first pulley to the second pully, a third pulley disposed side by side with the second pulley in a direction along the second axis and configured to rotate around the second axis integrally with the second pulley, a fourth pulley disposed to be separated from the third pulley and configured to rotate around a third axis parallel to the second axis, a second belt laid around the third and fourth pulleys and configured to (Continued)

transmit the power of the motor from the third pulley to the fourth pulley, and a first bearing located between the second and third pulleys and configured to support the second and third pulleys.

8 Claims, 6 Drawing Sheets

(56) References Cited

U.S. PATENT DOCUMENTS

| | | | | |
|---|---|---|---|---|
| 2005/0202116 A1* | 9/2005 | Kinoshita | ............... | B29C 45/42 |
| | | | | 425/444 |
| 2020/0139542 A1* | 5/2020 | Hashimoto | .......... | B25J 17/0283 |
| 2020/0306962 A1* | 10/2020 | Kawai | ...................... | B25J 9/044 |

FOREIGN PATENT DOCUMENTS

| | | | | | |
|---|---|---|---|---|---|
| CN | 211220698 U | | 8/2020 | | |
| CN | 111941411 A | * | 11/2020 | | |
| JP | H07-122620 A | | 5/1995 | | |
| JP | 2007-044839 A | | 2/2007 | | |
| JP | 2013006238 A | * | 1/2013 | | |
| JP | 2014136295 A | * | 7/2014 | .............. | B25J 17/02 |
| JP | 2019-118978 A | | 7/2019 | | |
| JP | 2020-069576 A | | 5/2020 | | |
| KR | 1020080062320 A | | 7/2008 | | |
| WO | WO-2020136890 A1 | * | 7/2020 | | |

\* cited by examiner

DRIVING MECHANISM AND ROBOT

The present application is based on, and claims priority from JP Application Serial Number 2021-013794, filed Jan. 29, 2021, the disclosure of which is hereby incorporated by reference herein in its entirety.

BACKGROUND

1. Technical Field

The present disclosure relates to a driving mechanism and a robot.

2. Related Art

For example, JP-A-2019-118978 (Patent Literature 1) describes a SCARA robot including a driving mechanism including a first pulley fixed to a rotating shaft of a linear motor, a ball screw fixed to a spline shaft, a second pulley fixed to the ball screw, and a belt laid around the first pulley and the second pulley. In such a SCARA robot, when the rotating shaft of the linear motor rotates, a rotational driving force of the first pulley is transmitted to the second pulley via the belt and the spline shaft rotates.

However, in the driving mechanism having such a configuration, when it is desired to greatly reduce the rotation speed of the ball screw with respect to the rotation speed of the rotating shaft of the linear motor, a pulley ratio of the first pulley and the second pulley needs to be increased. Therefore, the diameter of the second pulley increases. Consequently, the distal end portion of the SCARA robot increases in size.

SUMMARY

A driving mechanism according to an aspect of the present disclosure includes: a first pulley configured to rotate around a first axis; a motor configured to rotate the first pulley around the first axis; a second pulley disposed to be separated from the first pulley and configured to rotate around a second axis parallel to the first axis; a first belt laid around the first pulley and the second pulley and configured to transmit power of the motor from the first pulley to the second pully; a third pulley disposed side by side with the second pulley in a direction along the second axis and configured to rotate around the second axis integrally with the second pulley; a fourth pulley disposed to be separated from the third pulley and configured to rotate around a third axis parallel to the second axis; a second belt laid around the third pulley and the fourth pulley and configured to transmit the power of the motor from the third pulley to the fourth pulley; and a first bearing located between the second pulley and the third pulley and configured to support the second pulley and the third pulley.

A robot according to an aspect of the present disclosure includes the driving mechanism explained above.

DESCRIPTION OF EXEMPLARY EMBODIMENTS

A driving mechanism and a robot according to the present disclosure are explained in detail below with reference to embodiments shown in the accompanying drawings.

For convenience of explanation, an X axis, a Y axis, and a Z axis, which are three axes orthogonal to one another, are shown in the figures. In the following explanation, the upper side of the figures, that is, an arrow side of the Z axis is represented as the upper side of the vertical direction and the lower side of the figures, that is, the opposite side of the arrow of the Z axis is represented as the lower side in the vertical direction. "Parallel" in this specification has a meaning including, other than parallelism, a state slightly deviating from the parallelism, that is, has a meaning including a state regarded as the same as the parallelism based on the common general knowledge. Similarly, "orthogonal" in this specification has a meaning including, other than orthogonality, a state slightly deviating from the orthogonality, that is, has a meaning including a state regarded the same as the orthogonality based on the common general knowledge.

First Embodiment

Figure 1:
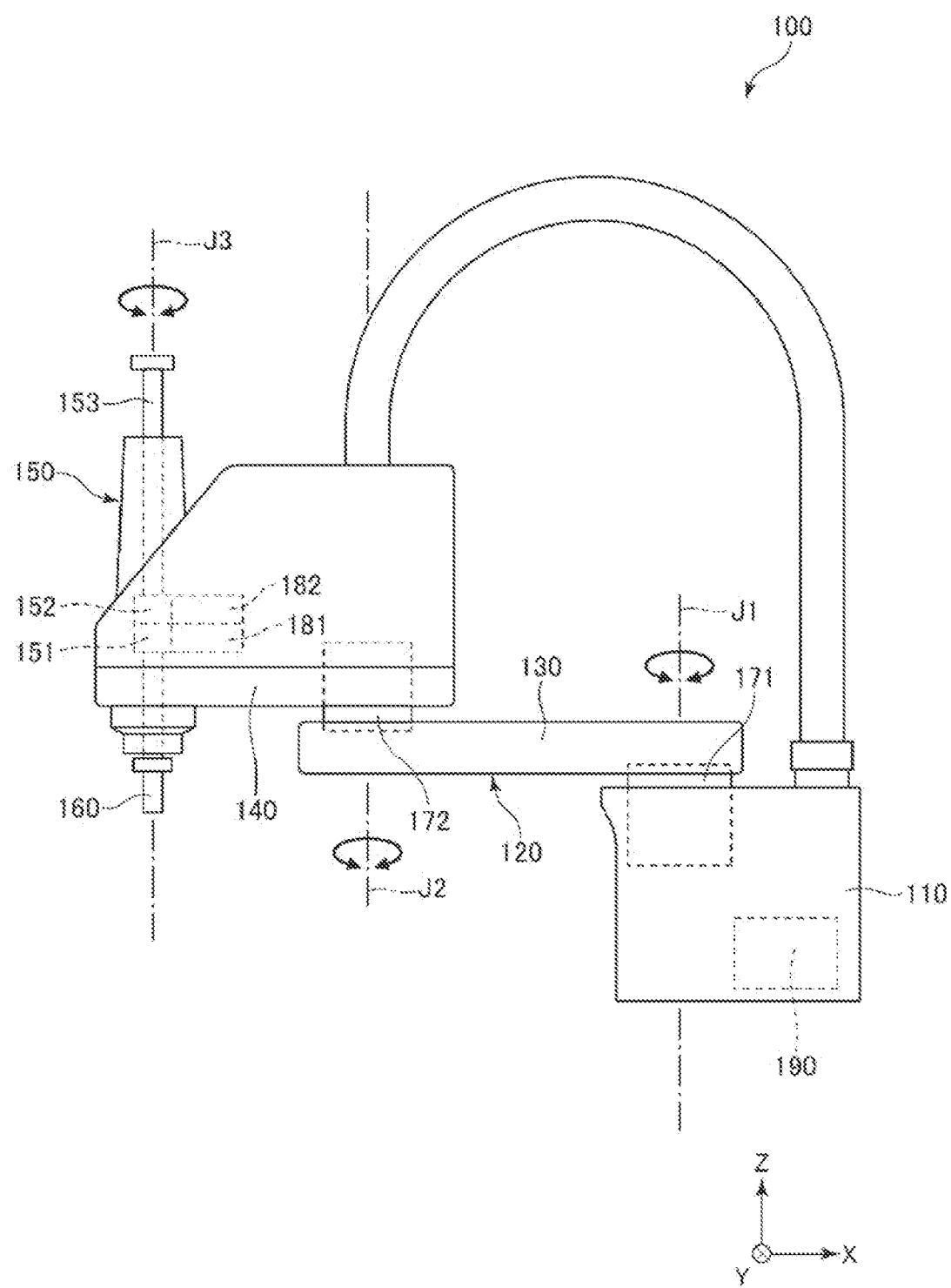
FIG. 1 is a side view showing an overall configuration of a robot according to a first embodiment.
Figure 2:
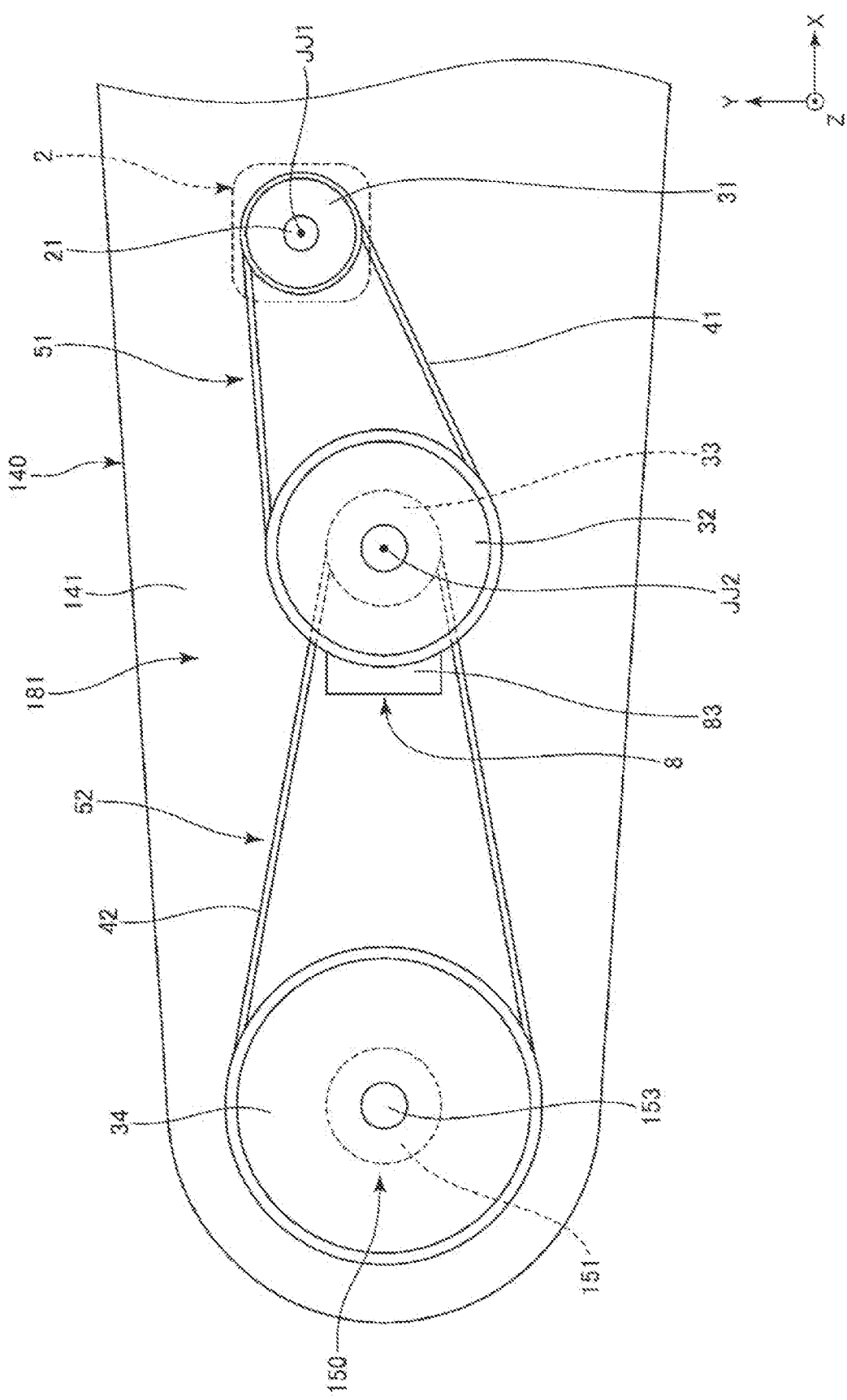
FIG. 2 is a plan view showing an internal structure of a second arm included in the robot shown in FIG. 1.
Figure 3:
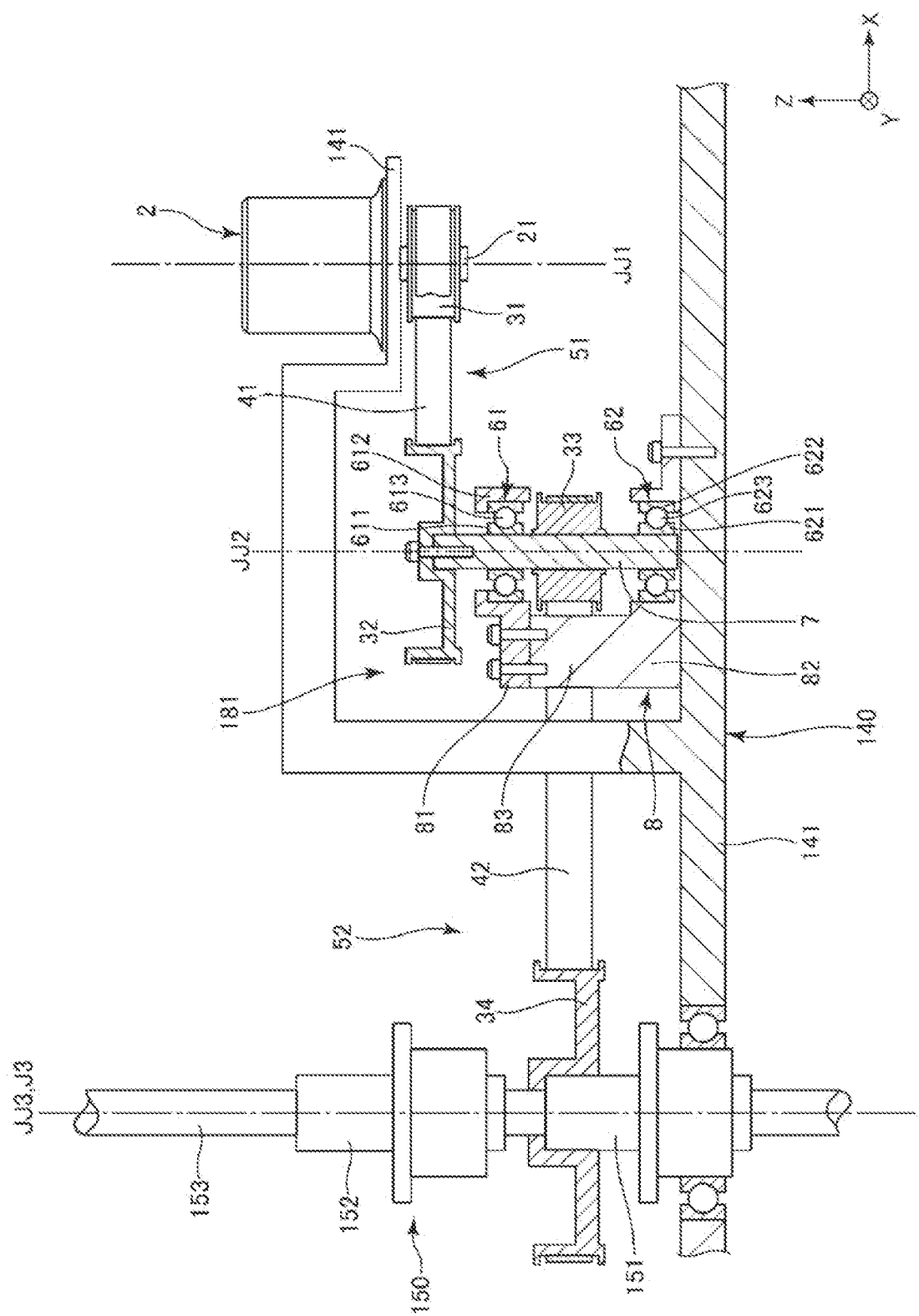
FIG. 3 is a sectional view showing a driving mechanism included in the second arm shown in FIG. 2.

FIG. 1 is a side view showing an overall configuration of a robot according to a first embodiment. FIG. 2 is a plan view showing an internal structure of a second arm included in the robot shown in FIG. 1. FIG. 3 is a sectional view showing a driving mechanism included in the second arm shown in FIG. 2.

A robot 100 shown in FIG. 1 is a SCARA robot and is used in work such as holding, conveyance, assembly, and inspection of a workpiece such as an electronic component. However, a use of the robot 100 is not particularly limited.

The robot 100 includes a base 110 fixed to a floor surface and an arm 120 coupled to the base 110. The arm 120 includes a first arm 130, the proximal end portion of which is coupled to the base 110, the first arm 130 turning around a first turning axis J1, which extends along the vertical direction, with respect to the base 110, and a second arm 140, the proximal end portion of which is coupled to the distal end portion of the first arm 130, the second arm 140 turning around a second turning axis J2, which extends along the vertical direction, with respect to the first arm 130. The first turning axis J1 and the second turning axis J2 are parallel.

A work head 150 is provided at the distal end portion of the second arm 140. The work head 150 includes a spline nut 151 and a ball screw nut 152 coaxially disposed at the distal end portion of the second arm 140 and a spline shaft 153 inserted through the spline nut 151 and the ball screw nut 152. The spline shaft 153 is capable of rotating around a third turning axis J3, which is the center axis of the second arm 140 and extends along the vertical direction, with respect to the second arm 140 and is capable of rising and falling along the third turning axis J3. The third turning axis J3 is parallel to the first turning axis J1 and the second turning axis J2.

However, the work head 150 is not particularly limited. For example, the work head 150 may have a configuration in which two shafts are provided and one shaft rotates around the third turning axis J3 and the other shaft rises and falls in an axial direction parallel to the third turning axis J3.

An end effector 160 is attached to the lower end portion of the spline shaft 153. As the end effector 160, an end effector detachably attachable and suitable for target work is selected as appropriate. Examples of the end effector 160 include a hand that holds a workpiece by clamping or attracting the work and a work tool that performs predetermined machining on the workpiece.

The robot 100 includes a joint actuator 171 that couples the base 110 and the first arm 130 and turns the first arm 130 around the first turning axis J1 with respect to the base 110 and a joint actuator 172 that couples the first arm 130 and the second arm 140 and turns the second arm 140 around the second turning axis J2 with respect to the first arm 130. The robot 100 includes a driving mechanism 181 that rotates the spline nut 151 and rotates the spline shaft 153 around the third turning axis J3 and a driving mechanism 182 that rotates the ball screw nut 152 and lifts and lowers the spline shaft 153 in a direction along the third turning axis J3.

The robot 100 includes a robot control device 190 that is disposed in the base 110 and controls driving of the joint actuators 171 and 172 and the driving mechanisms 181 and 182 based on a command from a not-shown host computer. The robot control device 190 can cause the robot 100 to perform desired work by controlling the joint actuators 171 and 172 and the driving mechanisms 181 and 182 independently from one another. The robot control device 190 is configured from, for example, a computer and includes a processor that processes information, a memory communicably coupled to the processor, and an external interface. Various programs executable by the processor are stored in the memory. The processor can read and execute the various programs and the like stored in the memory.

The overall configuration of the robot 100 is briefly explained above. Subsequently, the driving mechanism 181 that rotates the spline nut 151 and rotates the spline shaft 153 around the third turning axis J3 is explained in detail with reference to FIGS. 2 and 3.

As shown in FIGS. 2 and 3, the driving mechanism 181 includes a motor 2 functioning as a driving source. The motor 2 is fixed to a housing 141 of the second arm 140. An output shaft 21 of the motor 2 rotates around a first axis JJ1 extending along the vertical direction. The motor 2 is an AC servomotor. However, the motor 2 is not particularly limited. For example, a DC servomotor or a stepping motor may be used as the motor 2.

The driving mechanism 181 includes a first pulley 31, which is disposed in the output shaft 21 of the motor 2 and rotates around the first axis JJ1 integrally with the output shaft 21. The lower end of the output shaft 21 is a free end. The first pulley 31 can be detached from the lower end side. In this embodiment, the first pulley 31 is directly disposed in the output shaft 21. However, not only this, but, for example, a mechanism such as a power transmission mechanism or a speed reducer including a gear may be interposed between the output shaft 21 and the first pulley 31.

The driving mechanism 181 includes a second pulley 32 that is disposed to be separated from the first pulley 31 and rotates around a second axis JJ2 parallel to the first axis JJ1. The second pulley 32 is disposed on the distal end side of the second arm 140 with respect to the first pulley and located between the spline shaft 153 and the first pulley 31. The second pulley 32 is disposed side by side with the first pulley 31 in a direction along an X-Y plane. However, the disposition of the second pulley 32 is not particularly limited.

The driving mechanism 181 includes a first belt 41 that is laid around the first pulley 31 and the second pulley 32 and couples the first pulley 31 and the second pulley 32. Therefore, when the first pulley 31 rotates, the rotation is transmitted to the second pulley 32 via the first belt 41. The second pulley 32 rotates following the first pulley 31. The outer diameter of the second pulley 32 is larger than the outer diameter of the first pulley 31. Therefore, a first speed reducer 51 that reduces the rotation speed of the output shaft 21 of the motor 2 is configured by the first pulley 31, the first belt 41, and the second pulley 32.

The driving mechanism 181 includes a third pulley 33 that is disposed side by side with the second pulley 32 in a direction along the second axis JJ2 and rotates around the second axis JJ2. The third pulley 33 rotates integrally with the second pulley 32. The outer diameter of the third pulley 33 is smaller than the outer diameter of the second pulley 32.

The driving mechanism 181 includes a fourth pulley 34 that is disposed to be separated from the third pulley 33 and rotates around a third axis JJ3 parallel to the first and second axes JJ1 and JJ2. The fourth pulley 34 is disposed on the distal end side of the second arm 140 with respect to the third pulley 33 and disposed coaxially with the spline shaft 153. That is, the third axis JJ3 coincides with the third turning axis J3. The spline nut 151 is inserted through and fixed to the fourth pulley 34. The fourth pulley 34 and the spline nut 151 integrally rotate. The fourth pulley 34 is disposed side by side with the third pulley 33 in the direction along the X-Y plane. However, the disposition of the fourth pulley 34 is not particularly limited.

The driving mechanism 181 includes a second belt 42 that is laid around the third pulley 33 and the fourth pulley 34 and couples the third pulley 33 and the fourth pulley 34. Therefore, when the third pulley 33 rotates, the rotation is transmitted to the fourth pulley 34 via the second belt 42. The fourth pulley 34 rotates following the third pulley 33. The outer diameter of the fourth pulley 34 is larger than the outer diameter of the third pulley 33. Therefore, a second speed reducer 52 that reduces the rotation speed of the output shaft 21 of the motor 2 is configured by the third pulley 33, the second belt 42, and the fourth pulley 34.

The configuration of the driving mechanism 181 is not limited to this. For example, the driving mechanism 181 may include an idler that applies tension to the second belt 42.

In such a driving mechanism 181, a driving force of the motor 2 is transmitted to the spline nut 151 via the first speed reducer 51 and the second speed reducer 52. By interposing the first and second speed reducers 51 and 52 between the motor 2 and the spline nut 151 in this way, it is possible to rotate the spline nut 151 at desired rotation speed. Flexibility of disposition of the motor 2 increases. The second arm 140 is easily designed.

In particular, by disposing the two speed reducers between the motor 2 and the spline nut 151, the outer diameter of the fourth pulley 34 can be set smaller than when one speed reducer is disposed. Therefore, it is possible to suppress an increase in the size and an increase in the weight of the distal end portion of the second arm 140. It is possible to realize the robot 100 having an excellent driving characteristic. For example, when it is desired to reduce the rotation speed of the fourth pulley 34 to $\frac{1}{9}$ of the rotation speed of the output shaft 21, in the configuration in this embodiment, a pulley ratio of the first speed reducer 51 only has to be set to 3 and a pulley ratio of the second speed reducer 52 only has to be set to 3. Therefore, it is possible to suppress an excessive increase in the diameter of the fourth pulley 34. In contrast, in the case of only the second speed reducer 52, that is, when the first speed reducer 51 is omitted and the third pulley 33 is disposed in the output shaft 21, the pulley ratio of the second speed reducer 52 has to be set to 9. This causes an excessive increase in the diameter of the fourth pulley 34.

The driving mechanism 181 includes a first bearing 61 disposed between the second pulley 32 and the third pulley 33. The driving mechanism 181 includes a second bearing 62 located on the lower side of the third pulley 33 and disposed to sandwich the third pulley 33 between the second bearing 62 and the first bearing 61. That is, on the second axis JJ2, the second bearing 62, the third pulley 33, the first bearing 61, and the second pulley 32 are disposed side by side from the lower side. The first bearing 61 and the second bearing 62 respectively support the second pulley 32 and the third pulley 33 rotatably around the second axis JJ2. The second pulley 32 is supported at one end from the lower side by the first bearing 61. The third pulley 33 is supported at both ends from above and below by the first bearing 61 and the second bearing 62.

Since the rotation speed of the output shaft 21 is reduced by the first speed reducer 51, torque larger than torque applied to the first belt 41 is applied to the second belt 42. Therefore, in order to maintain durability, the rigidity of the second belt 42 needs to be set larger compared with the first belt 41. Accordingly, the tension of the second belt 42 also increases. As a result, a radial load larger than a radial load applied to the second pulley 32 is applied to the third pulley 33. Therefore, by supporting the third pulley 33 at both ends with the first bearing 61 and the second bearing 62 as in this embodiment, it is possible to more effectively suppress displacement of the third pulley 33 caused by the radial load. Therefore, the rotation of the third pulley 33 is stabilized. Compared with when the third pulley 33 is supported at one end by one bearing, the first bearing 61 and the second bearing 62 can be reduced in size. However, not only this, but the second bearing 62 may be omitted.

The first bearing 61 and the second bearing 62 are respectively not particularly limited. In this embodiment, a deep groove ball bearing is used as the first bearing 61 and the second bearing 62. The deep groove ball bearing can receive a radial load, an axial load in both directions, or a combined load obtained by combining the radial load and the axial load. The deep groove ball bearing can cope with high-speed rotation. Since the deep groove ball bearing is widely used, it is possible to realize a reduction in cost.

The first bearing 61 includes an inner ring 611 and an outer ring 612 disposed concentrically with each other and a plurality of balls 613 disposed between the inner ring 611 and the outer ring 612. Similarly, the second bearing 62 includes an inner ring 621 and an outer ring 622 disposed concentrically with each other and a plurality of balls 623 disposed between the inner ring 621 and the outer ring 622. The outer rings 612 and 622 of the first and second bearings 61 and 62 are fixed to the housing 141 of the second arm 140. A shaft section 7 extending along the second axis JJ2 is inserted into and fixed to the inner rings 611 and 621. The second pulley 32 and the third pulley 33 are fixed to the shaft section 7. With such a configuration, the second pulley 32 and the third pulley 33 can integrally rotates around the second axis JJ2.

The upper end of the shaft section 7 is a free end. Therefore, as explained below, it is possible to detach the first belt 41 from the second pulley 32 without being hindered by the shaft section 7.

Fixing of the first and second bearings 61 and 62 to the second arm 140 is explained. The driving mechanism 181 includes a coupling section 8 that couples the outer rings 612 and 622 of the first and second bearings 61 and 62 to each other. The coupling section 8 is fixed to the housing 141 of the second arm 140. Consequently, the first and second bearings 61 and 62 are collectively fixed to the housing 141 of the second arm 140. With such a configuration, it is easy to fix the first and second bearings 61 and 62 to the second arm 140. However, a method of fixing the first and second bearings 61 and 62 to the second arm 140 is not particularly limited.

The coupling section 8 includes a first bearing supporting section 81 that supports the outer ring 612 of the first bearing 61, a second bearing supporting section 82 that supports the outer ring 622 of the second bearing 62 and is fixed to the housing 141 of the second arm 140, and a coupling section 83 that couples the first bearing supporting section 81 and the second bearing supporting section 82. The second bearing supporting section 82 and the coupling section 83 are integrally formed. The coupling section 83 and the first bearing supporting section 81 are screwed. However, the configuration of the coupling section 8 is not limited to this. For example, the first bearing supporting section 81, the second bearing supporting section 82, and the coupling section 83 may be respectively configured by different members.

The coupling section 83 passes the inner side of the second belt 42 laid around the third pulley 33 and the fourth pulley 34 in a ring shape and couples the first bearing supporting section 81 and the second bearing supporting section 82. That is, the coupling section 8 passes the inner side of the second belt 42 and couples the first bearing 61 and the second bearing 62.

The configuration of the driving mechanism 181 is explained above. With the driving mechanism 181, it is possible to easily detach and attach the first belt 41 at the time of work such as repair, maintenance, and inspection. Specifically, the first belt 41 is loosened by detaching the first pulley 31 from the output shaft 21. The first belt 41 can be detached from the first pulley 31 and the second pulley 32. When the first belt 41 is attached, the opposite procedure only has to be performed. After the first belt 41 is laid around the first pulley 31 and the second pulley 32, the first pulley 31 only has to be fixed to the output shaft 21. In this way, with the driving mechanism 181, it is possible detach and attach the first belt 41 only by detaching and attaching the first pulley 31. Therefore, it is easy to detach and attach the first belt 41.

The second belt 42 is loosened by detaching the work head 150 from the second arm 140 and setting the fourth pulley 34 free. The second belt 42 can be detached from the third pule 33 and the fourth pulley 34. When the second belt 42 is attached, the opposite procedure only has to be performed. After the second belt 42 is laid around the third and fourth pulleys 33 and 34, the work head 150 only has to be inserted into and fixed to the housing 141 of the second arm 140. In this way, with the driving mechanism 181, it is possible to detach and attach the second belt 42 only by detaching and attaching the work head 150. Therefore, it is easy to detach and attach the second belt 42. In particular, in this embodiment, the coupling section 8 passes the inner side of the second belt 42 and couples the first bearing 61 and the second bearing 62. Therefore, it is possible to smoothly detach the second belt 42 without being hindered by the coupling section 8.

For example, when the driving mechanism 181 includes an idler that applies tension to the second belt 42, by loosening the idler, it is possible to detach the second belt 42 from the third pulley 33 and the fourth pulley 34 without detaching the work head 150.

If a belt is once loosened, tension needs to be applied to the belt when the belt is attached again. Work for applying the tension requires labor. Therefore, if the second belt 42 needs to be detached in order to detach the first belt 41, work for applying tension to each of the first and second belts 41 and 42 again is necessary. Therefore, considerable labor is required. The same occurs when the first belt 41 needs to be detached in order to detach the second belt 42. In contrast, with the driving mechanism 181, it is unnecessary to detach the second belt 42 in order to detach the first belt 41 and it is unnecessary to detach the first belt 41 in order to detach the second belt 42. Therefore, the labor of the work for applying tension again at the time when the belt is attached again is reduced.

The robot 100 is explained above. The driving mechanism 181 included in such a robot 100 includes, as explained above, the first pulley 31 that rotates around the first axis JJ1, the motor 2 that rotates the first pulley 31 around the first axis JJ1, the second pulley 32 that is disposed to be separated from the first pulley 31 and rotates around the second axis JJ2 parallel to the first axis JJ1, the first belt 41 that is laid around the first pulley 31 and the second pulley 32 and transmits power of the motor 2 from the first pulley 31 to the second pulley 32, the third pulley 33 that is disposed side by side with the second pulley 32 in the direction along the second axis JJ2 and rotates around the second axis JJ2 integrally with the second pulley 32, the fourth pulley 34 that is disposed to be separated from the third pulley 33 and rotates around the third axis JJ3 parallel to the second axis JJ2, the second belt 42 that is laid around the third pulley 33 and the fourth pulley 34 and transmits the power of the motor 2 from the third pulley 33 to the fourth pulley 34, and the first bearing 61 that is located between the second pulley 32 and the third pulley 33 and supports the second pulley 32 and the third pulley 33. With such a configuration, even when it is desired to obtain a large reduction ratio, it is possible to reduce the outer diameter of the fourth pulley 34. Therefore, it is possible to suppress an increase in the size and an increase in the weight of the distal end portion of the second arm 140. It is possible to realize the robot 100 having an excellent driving characteristic. It is unnecessary to detach the second belt 42 in order to detach the first belt 41. It is unnecessary to detach the first belt 41 in order to detach the second belt 42. Therefore, it is easy to detach and attach the first belt 41. The labor of the work for applying tension again when the belt is attached again is reduced.

As explained above, the driving mechanism 181 includes the second bearing 62 that is disposed to sandwich the third pulley 33 between the second bearing 62 and the first bearing 61 and supports the third pulley 33. Consequently, the third pulley 33 is supported at both ends by the first bearing 61 and the second bearing 62. Therefore, it is possible to more effectively suppress displacement of the third pulley 33 caused by the tension of the second belt 42. The rotation of the third pulley 33 is stabilized. Compared with when the third pulley 33 is supported at one end only by the first bearing 61, the first bearing 61 and the second bearing 62 can be reduced in size.

As explained above, the driving mechanism 181 includes the coupling section 8 that passes the inner side of the second belt 42 and couples the first bearing 61 and the second bearing 62. Consequently, it is possible to detach and attach the second belt 42 without being hindered by the coupling section 8.

As explained above, the robot 100 includes the driving mechanism 181. Therefore, the robot 100 can enjoy the effect of the driving mechanism 181 and exert high maintainability.

Second Embodiment

Figure 4:
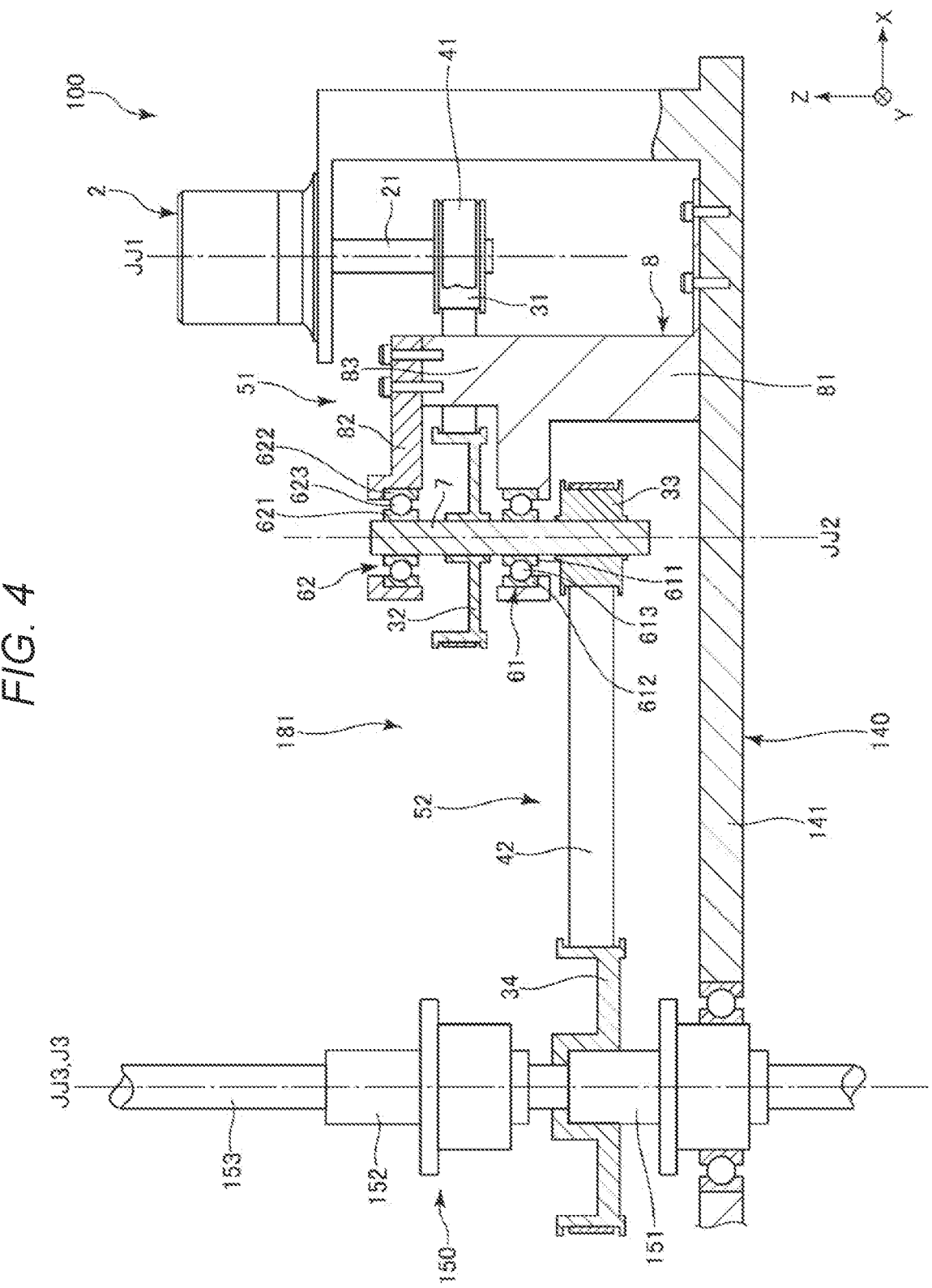
FIG. 4 is a sectional view showing a driving mechanism included in a robot according to a second embodiment.

FIG. 4 is a sectional view showing a driving mechanism included in a robot according to a second embodiment.

The robot 100 in this embodiment is the same as the robot 100 in the first embodiment except that the disposition of the second bearing 62 and the configuration of the coupling section 8 are different. In the following explanation, concerning this embodiment, differences from the first embodiment are mainly explained. Explanation about similarities to the first embodiment is omitted. In FIG. 4, the same components as the components in the first embodiment are denoted by the same reference numerals and signs.

As shown in FIG. 4, in the driving mechanism 181 in this embodiment, the second bearing 62 is located on the upper side of the second pulley 32 and is disposed to sandwich the second pulley 32 between the second bearing 62 and the first bearing 61. Therefore, the second pulley 32 is supported at both ends from above and below by the first bearing 61 and the second bearing 62. The third pulley 33 is supported at one end from the upper side by the first bearing 61. With such a configuration, the second pulley 32 can be supported in a more stable posture. The rotation of the second pulley 32 is stabilized. Compared with when the second pulley 32 is supported at one end only by the first bearing 61, the first bearing 61 and the second bearing 62 can be reduced in size.

The coupling section 8 includes the first bearing supporting section 81 that supports the outer ring 612 of the first bearing 61 and is fixed to the housing 141 of the second arm 140, the second bearing supporting section 82 that supports the outer ring 622 of the second bearing 62, and the coupling section 83 that couples the first bearing supporting section 81 and the second bearing supporting section 82. The first bearing supporting section 81 and the coupling section 83 are integrally formed. The coupling section 83 and the second bearing supporting section 82 are screwed. However, the configuration of the coupling section 8 is not limited to this.

The coupling section 83 passes the inner side of the first belt 41 laid around the first pulley 31 and the second pulley 32 in a ring shape and couples the first bearing supporting section 81 and the second bearing supporting section 82. That is, the coupling section 8 passes the inner side of the first belt 41 and couples the first bearing 61 and the second bearing 62. Consequently, work for detaching the first pulley 31 from the output shaft 21 and detaching the first belt 41 from the first pulley 31 and the second pulley 32 is not hindered by the coupling section 8. The work can be smoothly performed.

As explained above, the driving mechanism 181 in this embodiment includes the second bearing 62 that is disposed to sandwich the second pulley 32 between the second bearing 62 and the first bearing 61 and supports the second pulley 32. Consequently, the second pulley 32 is supported at both ends by the first bearing 61 and the second bearing 62. Therefore, the rotation of the second pulley 32 is further stabilized. Compared with when the second pulley 32 is supported at one end by only the first bearing 61, the first bearing 61 and the second bearing 62 can be reduced in size.

As explained above, the driving mechanism 181 includes the coupling section 8 that passes the inner side of the first belt 41 and couples the first bearing 61 and the second bearing 62. Consequently, it is possible to detach and attach the first belt 41 without being hindered by the coupling section 8.

According to the second embodiment explained above, the same effects as the effects of the first embodiment can be exerted.

Third Embodiment

Figure 5:
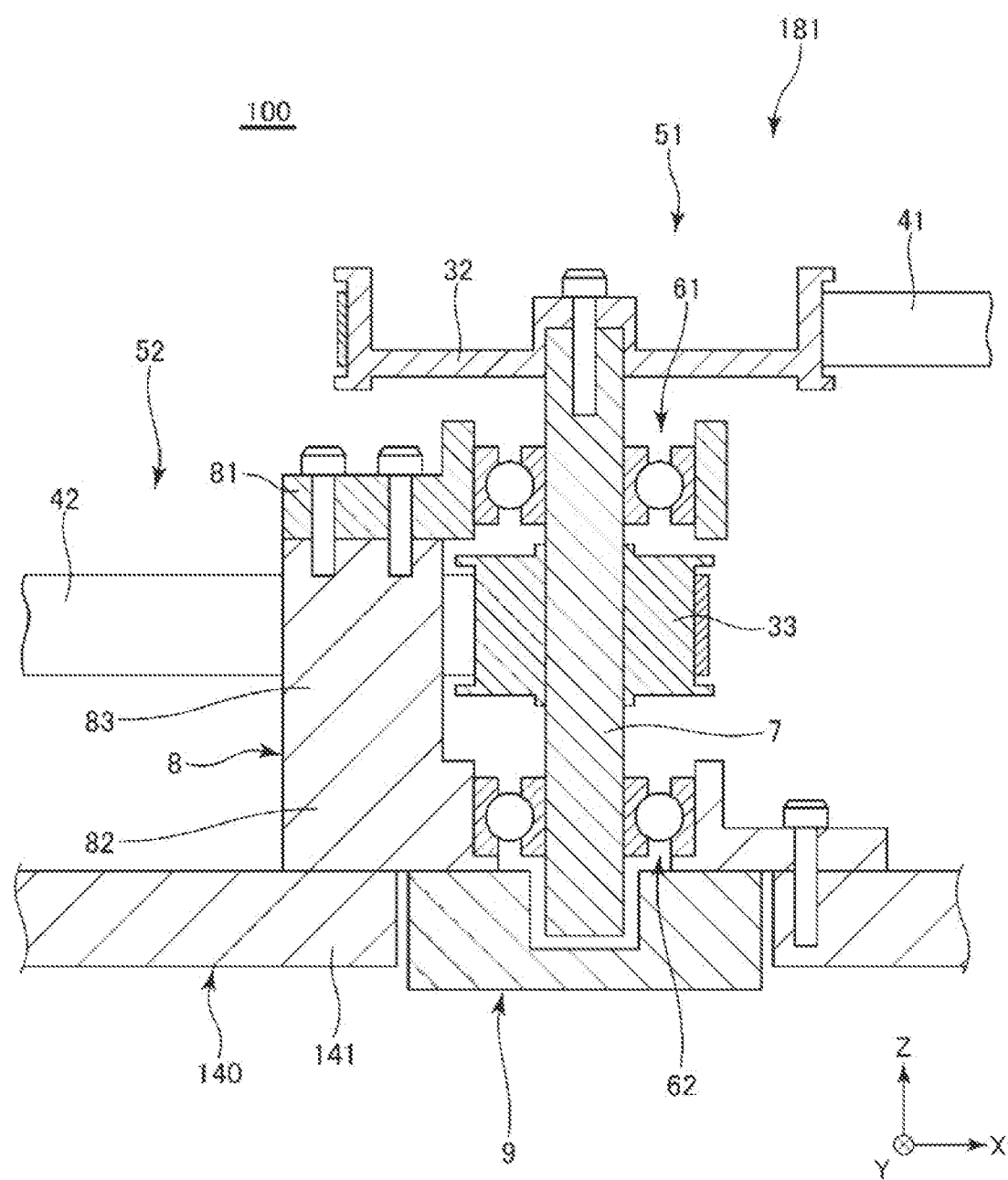
FIG. 5 is a sectional view showing a driving mechanism included in a robot according to a third embodiment.

FIG. 5 is a sectional view showing a driving mechanism included in a robot according to a third embodiment.

The robot 100 in this embodiment is the same as the robot 100 in the first embodiment except that the driving mechanism 181 further includes a brake 9. In the following explanation, concerning this embodiment, differences from the embodiments explained above are mainly explained. Explanation about similarities to the embodiments explained above is omitted. In FIG. 5, the same components as the components in the embodiments explained above are denoted by the same reference numerals and signs.

As shown in FIG. 5, the driving mechanism 181 in this embodiment includes the brake 9 that restricts the rotation of the pulleys 31, 32, 33, and 34. The brake 9 is provided in the shaft section 7 and restricts the rotation of the shaft section 7 to thereby restrict the rotation of the pulleys 31, 32, 33, and 34. The brake 9 is not particularly limited if the brake 9 can switch a state in which the rotation of the shaft section 7 is restricted and a state in which the rotation of the shaft section 7 is allowed.

In particular, the brake 9 is disposed on the lower side of the second bearing 62. Consequently, for example, compared with when the brake 9 is disposed on the upper side of the second pulley 32, since a member is not interposed between the brake 9 and the second bearing 62, the brake 9 can be disposed near the second bearing 62. Therefore, the rotation of the shaft section 7 can be stably restricted by the brake 9. Since the brake 9 is disposed on the lower side of the second bearing 62, the brake 9 less easily affects detachment and attachment of the first belt 41.

According to the third embodiment explained above, the same effects as the effects of the first embodiment can be exerted.

Fourth Embodiment

Figure 6:
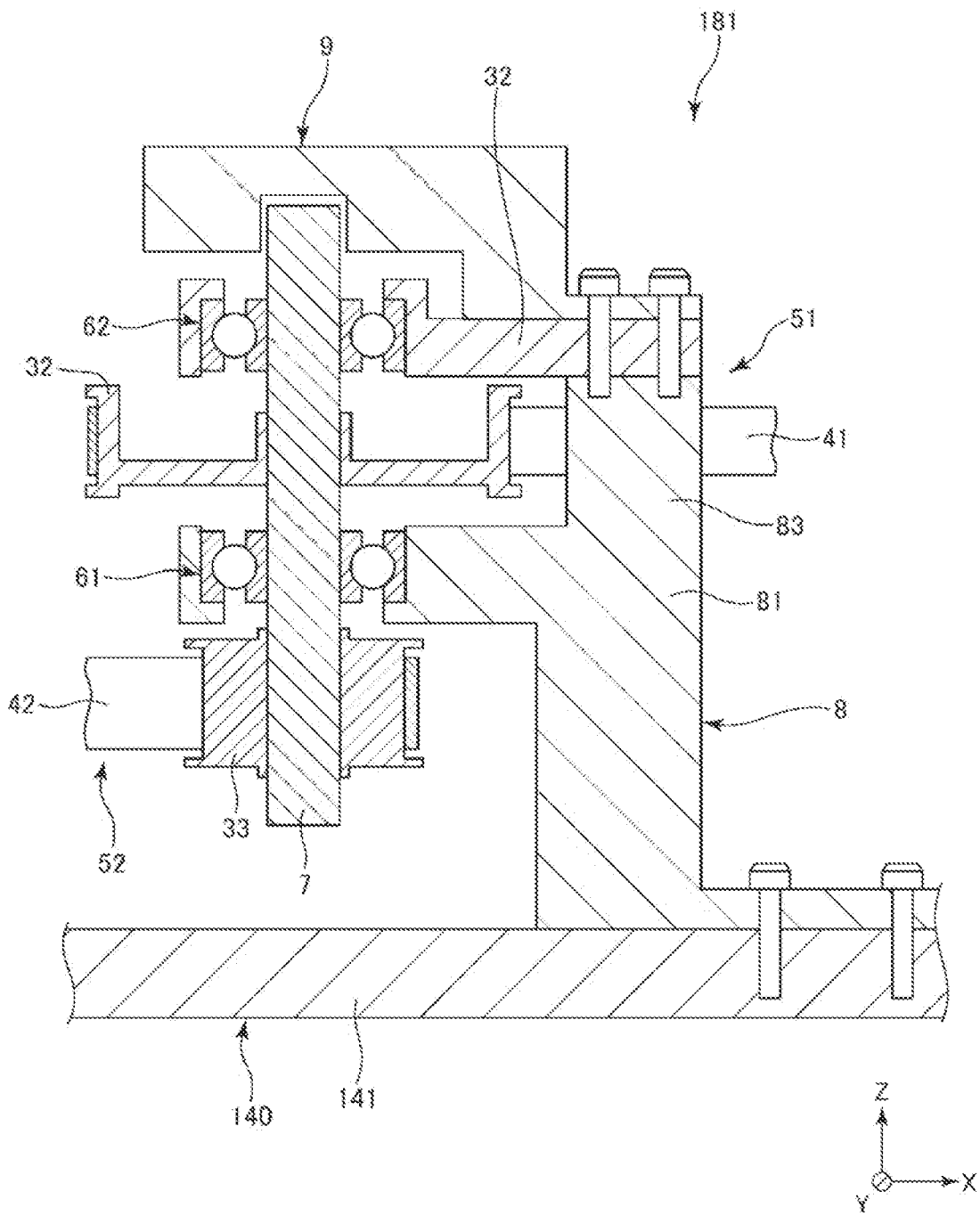
FIG. 6 is a sectional view showing a driving mechanism included in a robot according to a fourth embodiment.

FIG. 6 is a sectional view showing a driving mechanism included in a robot according to a fourth embodiment.

The robot 100 in this embodiment is the same as the robot 100 in the second embodiment except that the driving mechanism 181 further includes the brake 9. In the following explanation, concerning this embodiment, differences from the embodiments explained above are mainly explained. Explanation about similarities to the embodiments explained above is omitted. In FIG. 6, the same components as the components in the embodiments explained above are denoted by the same reference numerals and signs.

As shown in FIG. 6, the driving mechanism 181 in this embodiment includes the brake 9 that restricts the rotation of the pulleys 31, 32, 33, and 34. The brake 9 is provided in the shaft section 7 and restricts the rotation of the shaft section 7 to thereby restrict the rotation of the pulleys 31, 32, 33, and 34. The brake 9 is not particularly limited if the brake 9 can switch a state in which the rotation of the shaft section 7 is restricted and a state in which the rotation of the shaft section 7 is allowed.

In particular, the brake 9 is disposed on the upper side of the second bearing 62. Consequently, for example, compared with when the brake 9 is disposed on the lower side of the third pulley 33, since a member is not interposed between the brake 9 and the second bearing 62, the brake 9 can be disposed near the second bearing 62. Therefore, the rotation of the shaft section 7 can be stably restricted by the brake 9. In a plan view along the Z axis, the brake 9 is fixed to the housing 141 of the second arm 140 via the coupling section 8 on the inner side of the first belt 41. Consequently, the brake 9 less easily affects detachment and attachment of the first belt 41.

According to the fourth embodiment explained above, the same effects as the effects of the first embodiment can be exerted.

The driving mechanism and the robot according to the present disclosure are explained above with reference to the embodiments shown in the figures. However, the present disclosure is not limited to this. The components of the sections can be replaced with any components having the same functions. Any other components may be added to the present disclosure. The driving mechanism may be applied to any equipment other than the robot.

What is claimed is:

1. A robot comprising:
a base;
a first arm rotatably connected to the base around a first turning axis; and
a second arm rotatably connected to the first arm around a second turning axis;
the second arm having:
a first pulley configured to rotate around a first axis;
a motor configured to rotate the first pulley around the first axis;
a second pulley disposed to be separated from the first pulley and configured to rotate around a second axis parallel to the first axis;
a first belt laid around the first pulley and the second pulley;
a third pulley disposed coaxially with the second pulley in a direction along the second axis and configured to rotate around the second axis;
a shaft extending along the second axis;
a fourth pulley disposed to be separated from the third pulley, the fourth pulley configured to rotate around a third turning axis that is parallel to the second axis;
a second belt laid around the third pulley and the fourth pulley;
a first bearing located between the second pulley and the third pulley and in contact with the shaft, and
a second bearing in contact with the shaft,
wherein the third pulley is sandwiched between the first bearing and the second bearing,
when the second arm is viewed along a first straight line parallel to the second axis, the first axis is offset from a second straight line passing through the third axis and extending along a longitudinal direction of the second arm,
a distance between the second straight line and the second axis is less than a distance between the second straight line and the first axis, and when the shaft is viewed along a direction perpendicular to the second axis, the third pulley does not overlap the second bearing along the direction perpendicular to the second axis.

2. The robot according to claim 1, further comprising:
a spline shaft provided at the arm, the spline shaft having an end effector arranged at an end portion thereof, a spline nut, and a ball screw nut;
a first driving mechanism configured to rotate the spline nut, and configured to rotate the spline shaft around the third turning axis; and
a second driving mechanism configured to rotate the ball screw nut, and configured to lift and lower the spline shaft in a direction along the third turning axis;
wherein the spline nut is arranged closer to the end portion of the spline shaft than the ball screw nut.

3. The robot according to claim 1, wherein
when the shaft is viewed along the direction perpendicular to the second axis, the second pulley does not overlap the first bearing along the direction perpendicular to the second axis.

4. The robot according to claim 1, further comprising a second bearing supporting section fixed to the second arm and supporting the second bearing.

5. The robot according to claim 1, further comprising a first bearing supporting section fixed to the second arm and supporting the first bearing.

6. The robot according to claim 1, wherein a rigidity of the second belt is larger than a rigidity of the first belt.

7. The robot according to claim 1, wherein the second bearing is fixed to the second arm.

8. A driving mechanism comprising:
a first pulley configured to rotate around a first axis;
a motor configured to rotate the first pulley around the first axis;
a second pulley disposed to be separated from the first pulley and configured to rotate around a second axis parallel to the first axis;
a first belt laid around the first pulley and the second pulley and configured to transmit power of the motor from the first pulley to the second pulley;
a third pulley disposed coaxially with the second pulley in a direction along the second axis and configured to rotate around the second axis integrally with the second pulley;
a shaft extending along the second axis, the second pulley and the third pulley being fixed to the shaft;
a fourth pulley disposed to be separated from the third pulley and configured to rotate around a third axis parallel to the second axis;
a second belt laid around the third pulley and the fourth pulley and configured to transmit the power of the motor from the third pulley to the fourth pulley;
a first bearing located between the second pulley and the third pulley and in contact with the shaft; and
a second bearing in contact with the shaft,
wherein the third pulley is sandwiched between the first bearing and the second bearing,
the second pulley and the fourth pulley are aligned along a straight line, and the first pulley is offset from the straight line, and
when the shaft is viewed along a direction perpendicular to the second axis, the third pulley does not overlap the second bearing along the direction perpendicular to the second axis.

* * * * *